No. 816,346. PATENTED MAR. 27, 1906.
O. B. MANN.
HAY RAKE AND STACKER.
APPLICATION FILED JULY 31, 1905.
4 SHEETS—SHEET 3.
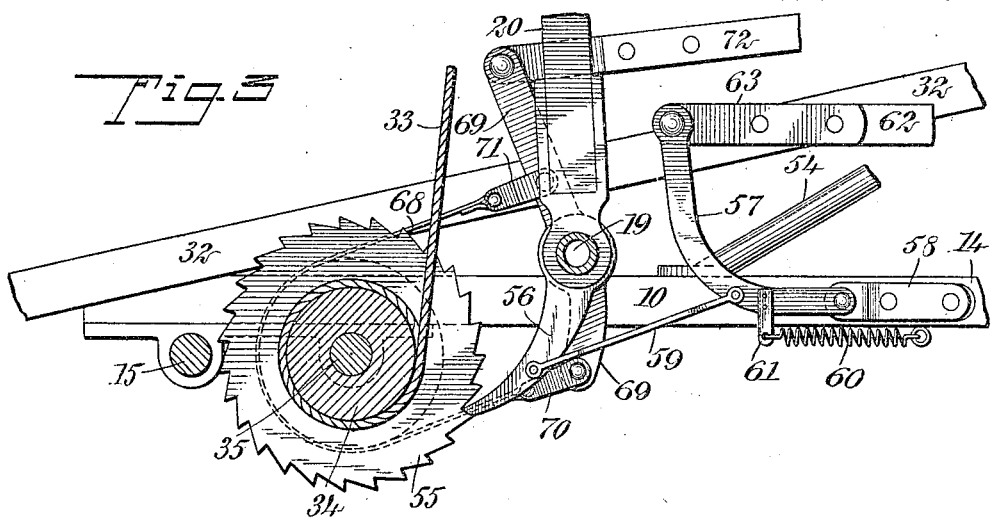
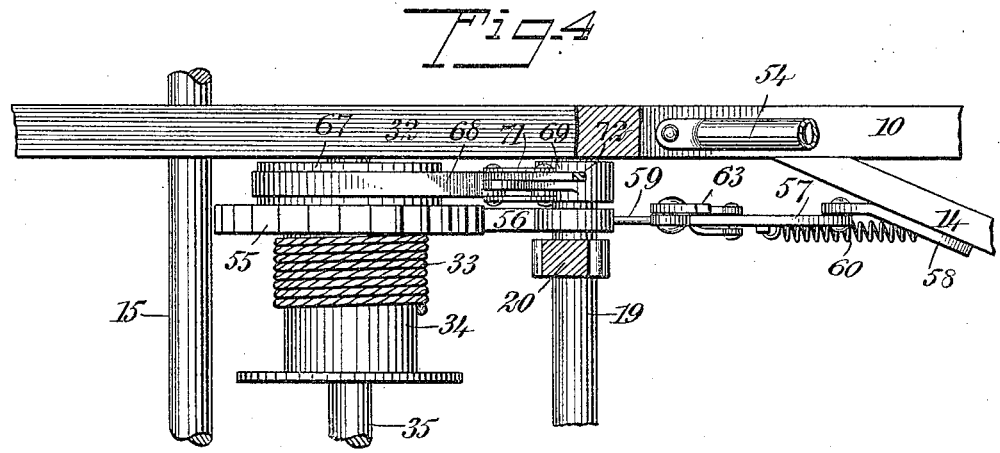
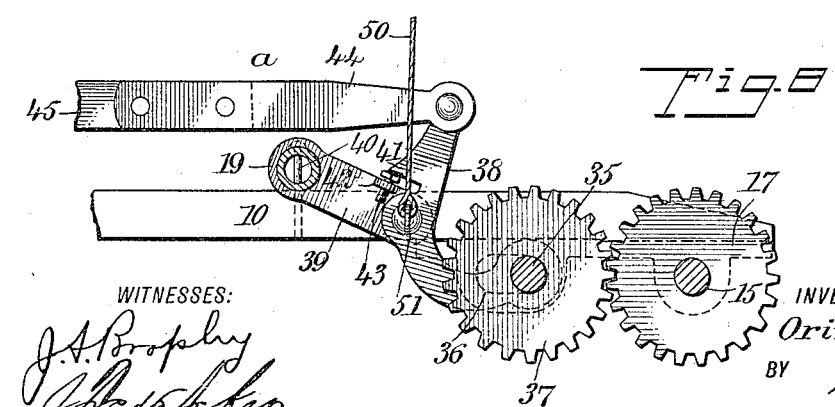
WITNESSES:
J. A. Brophy
J. Wedekken
INVENTOR
Orin B. Mann
BY
ATTORNEYS No. 816,346. PATENTED MAR. 27, 1906.
O. B. MANN.
HAY RAKE AND STACKER.
APPLICATION FILED JULY 31, 1905.
4 SHEETS—SHEET 4.
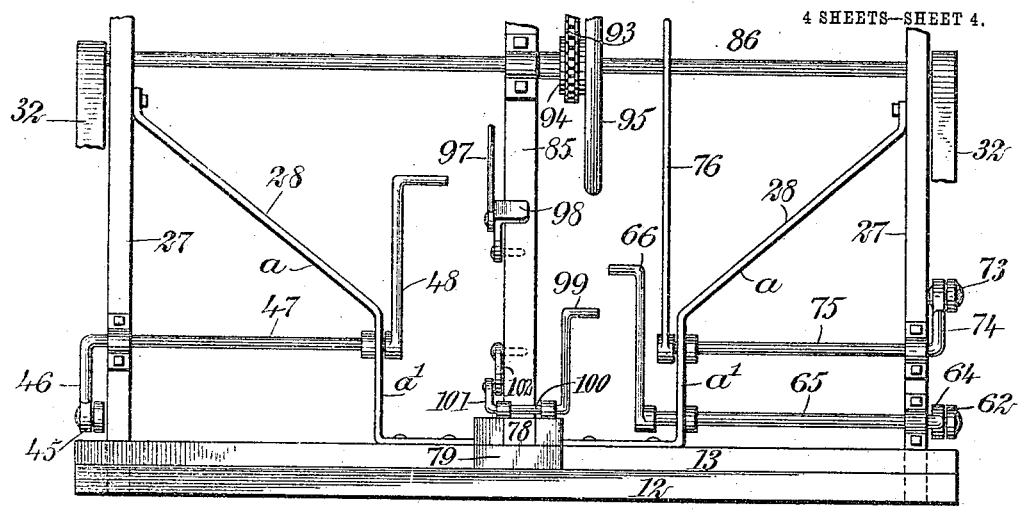
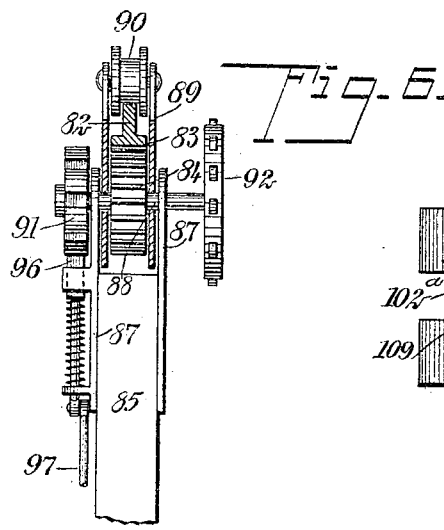
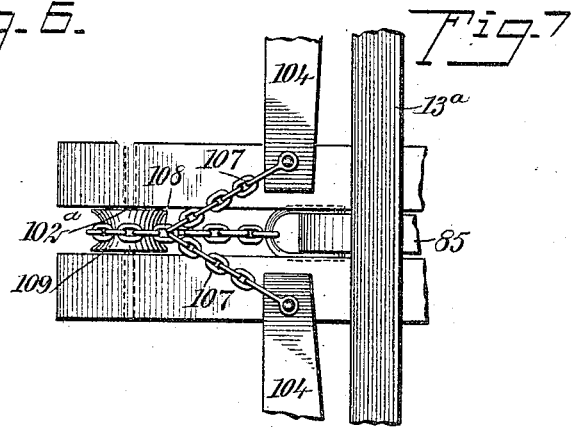
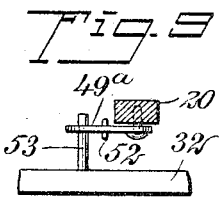
WITNESSES:
INVENTOR
Orin B. Mann
BY
ATTORNEYS

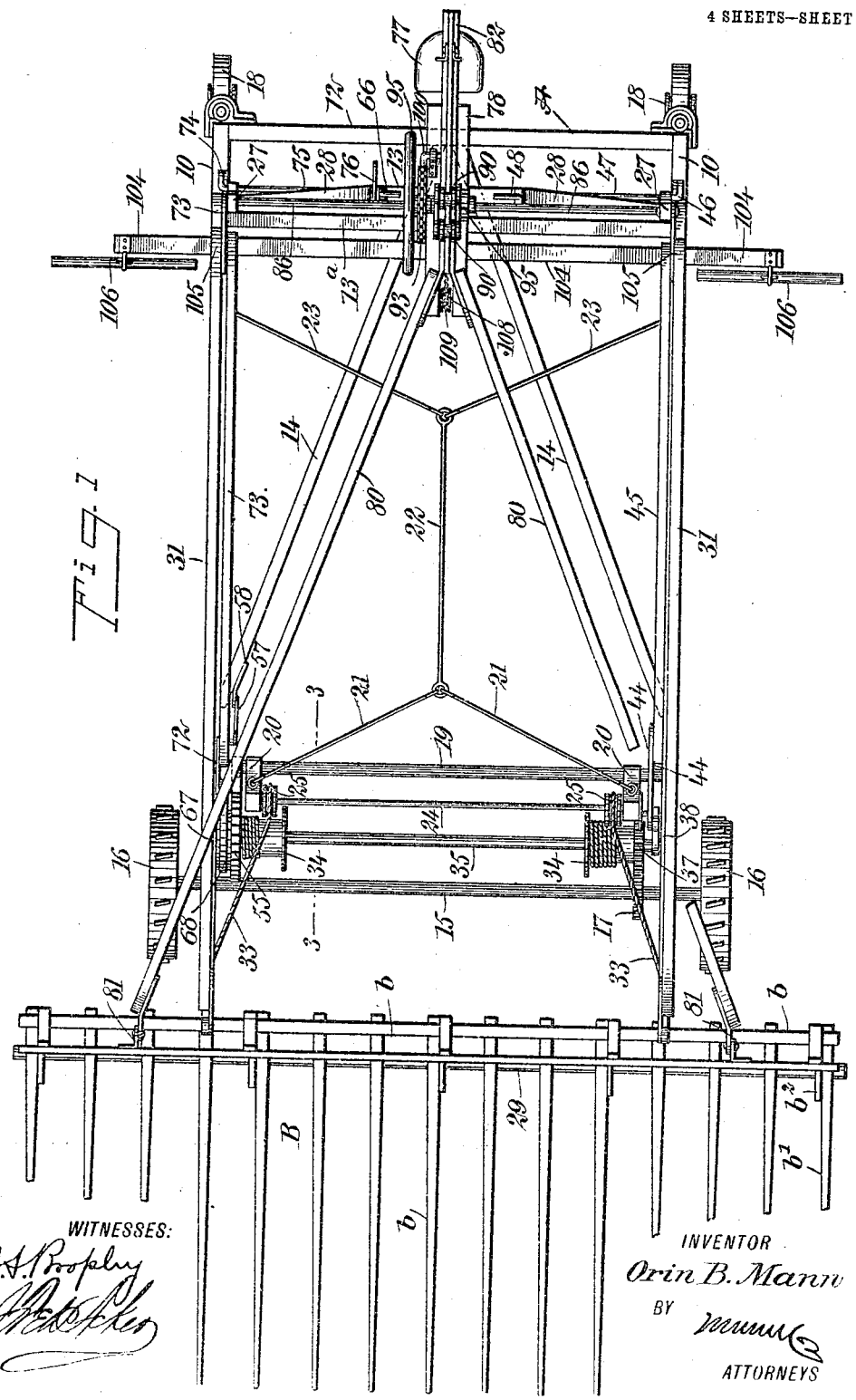

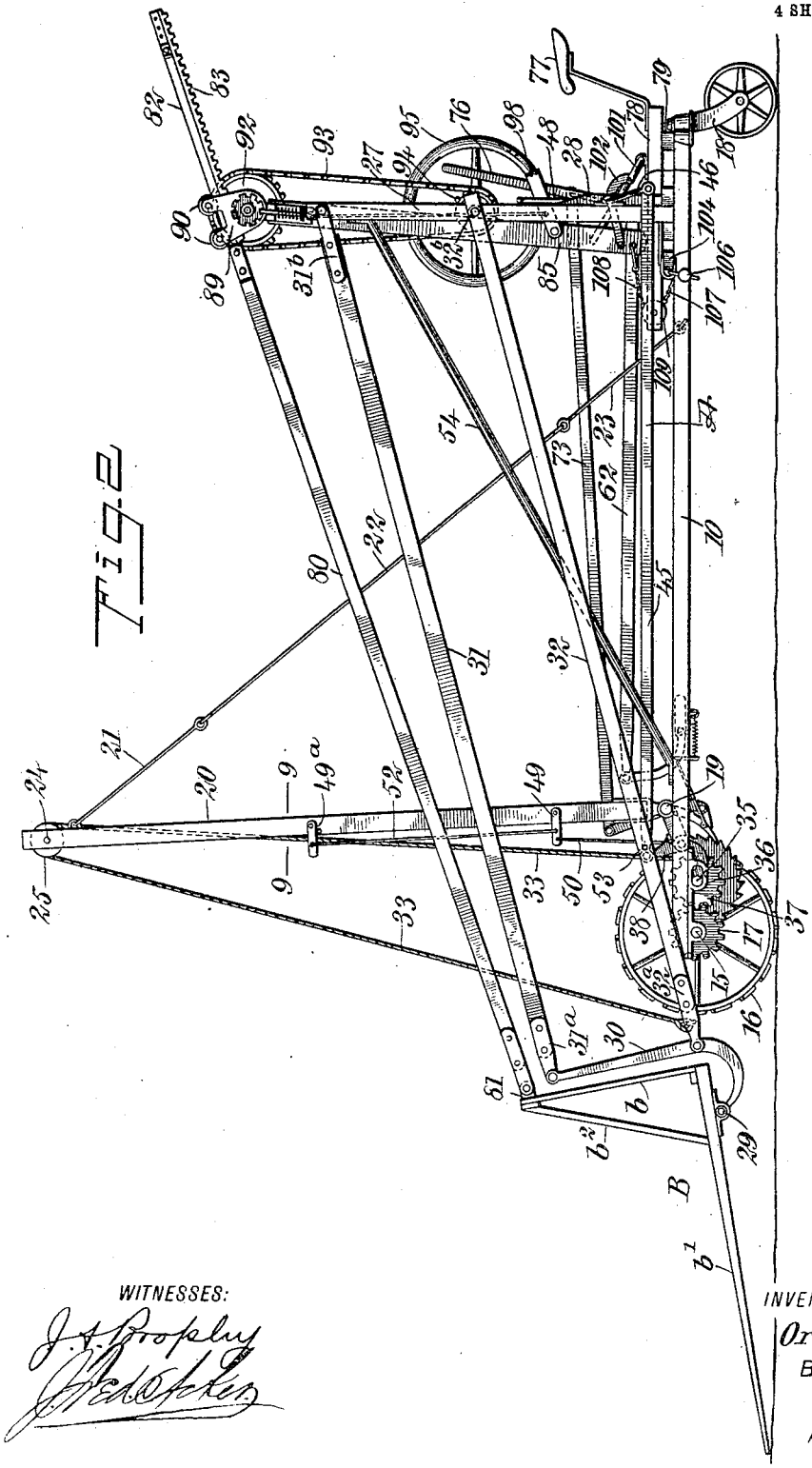

UNITED STATES PATENT OFFICE.

ORIN B. MANN, OF MEETEETSE, WYOMING.

HAY RAKE AND STACKER.

No. 816,346.   Specification of Letters Patent.   Patented March 27, 1906.

Application filed July 31, 1905. Serial No. 271,989.

*To all whom it may concern:*

Be it known that I, ORIN B. MANN, a citizen of the United States, and a resident of Meeteetse, in the county of Bighorn and State of Wyoming, have invented a new and Improved Hay Rake and Stacker, of which the following is a full, clear, and exact description.

The purpose of my invention is to provide a hay rake or stacker simple, durable, and economic which will gather up the hay as the machine advances and when a load is obtained whereby the rake may be raised so that its load will not trail upon the ground while the machine is being drawn to the stack, and, further, when the stack is reached whereby the rake can be elevated as high as desired, held in elevated position, and the load discharged, and, furthermore, wherein the rake-teeth may be given any desired inclination upward or downward, all of the operations being entirely under the control of the driver seated at the back of the machine.

Another purpose of the invention is to improve upon the hay rake and stacker for which Letters Patent were granted to me December 20, 1904, No. 778,056, to the extent that the device for tilting the hay-rake is rendered much more simple and is under better control and whereby the means for carrying the driving-shaft of the machine into and out of gear with the drum-shaft is materially changed, being rendered more positive and expeditious in its action. Another improvement on the patent aforesaid relates to the brakes and the arrangement for raising and lowering the rake and means whereby the dip of the teeth of the rake can be readily regulated, the means provided for such purpose being conveniently operated by the driver.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved machine. Fig. 2 is a left-hand side elevation of the said machine. Fig. 3 is an enlarged sectional view through the forward portion of the machine, the section being taken practically on the line 3 3 of Fig. 1, and it is also a side elevation of the releasing and brake mechanisms. Fig. 4 is a sectional plan view of the parts shown in Fig. 3. Fig. 5 is a detail rear elevation showing the arrangement of the levers employed. Fig. 6 is an enlarged vertical section of the tilting mechanism of the rake. Fig. 7 is a bottom plan view of that portion of the machine at which the lower members of the draft device approach each other. Fig. 8 is a vertical section through the drum and the driving shafts and a side elevation of the mechanism employed for throwing the two shafts into and out of gear; and Fig. 9 is a detail sectional view of the auxiliary automatic shifting mechanism, the section being taken substantially on the line 9 9 of Fig. 2.

A represents the base-frame of the machine and consists of parallel side pieces 10, a rear connecting-bar 12, intermediate bars 13 and 13ª, adjacent to the rear connecting-bar 12, and diagonal brace-bars 14, which extend from the forward portion of the side bars 10 to the central portion of the rear connecting-bar 12. The frame is supported at its forward end by an axle or shaft 15, mounted to turn in suitable bearings on the frame, and the said axle or shaft 15 is provided with roughened supporting-wheels 16, secured at its ends. At the left-hand end of the axle 15 within the frame A a gear 17 is secured, and the rear end of the base-frame is supported preferably by caster-wheels 18.

A bar, preferably a tubular bar 19, extends from side to side of the frame at the rear of the axle 15 and parallel therewith, and on the said bar near each end within the frame standards 20 are preferably loosely mounted, and the said standards 20 are prevented from dropping forward by means of links 21, secured to the upper ends of the said standards, as is shown in Fig. 1, which links connect with a downwardly and rearwardly extending single link 22. This rearwardly-extending link 22 at its lower end is connected with links 23, carried to the right and to the left and secured to the sides 10 of the frame, as is shown in Fig. 2. The upper ends of the standards 20 are connected by a rod 24, upon which rod peripherally-grooved pulleys 25 are mounted to turn adjacent to the inner faces of said standards 20, as is clearly shown in Fig. 1.

Standards 27, shorter than the forward standards 20, are secured to the side portions of the frame at the rear intermediate cross-bar 13, strengthened by metal braces 28, and, as is shown in Fig. 5, these braces 28 comprise an upper section $a$, which extends from the standards 27 downwardly and inwardly, and vertical sections $a'$, which are carried down to the aforesaid intermediate cross-bar 13.

The rake B consists, as usual, of a vertical back section $b$, teeth $b'$ at right angles to the back section $b$, and braces $b^2$, extending from sundry of the teeth to the upper portion of the back section of the rake. At the bottom rear portion of the rake a shaft 29 is journaled in suitable bearings extending from side to side of the rake. The rake is much wider than the frame A—in fact, it extends out beyond the supporting-wheels 16, as is shown in Fig. 1.

Hangers 30 are employed in connection with the rake B. These hangers are two in number and consist of a vertical upper portion and an upwardly-curved lower portion. The lower portions of the hangers are mounted upon the shaft 29 at the bottom of the rake, as is shown in Fig. 2, and the said hangers are located one at each side of the center of the vertical section of the rake. The straight sections of the said hangers extend upward parallel with the vertical section $b$ of the rake, as is also shown in Fig. 2.

In connection with the rake and its hangers upper and lower parallel combined guide and lifting arms 31 and 32 are provided, the arms being located at each side of the frame. The upper arms 31 at their forward ends are preferably provided with metal extensions $31^a$, which are pivotally connected with the upper ends of the straight portions or sections of the hangers, and similar extensions $31^b$ at the rear ends of the arms 31 are pivotally connected with the upper portions of the rear standards 27 at their outer side faces. The lower arms 32 are provided with metal extensions $32^a$ at their forward ends, and these metal extensions are pivotally connected with the lower portion of the straight sections of the said hangers, as is shown in Fig. 2. In fact, the connection between the hangers and the lower arms 32 are about on a line with the rear ends of the rake-teeth $b'$. The rear ends of the lower arms 32 are pivotally connected to the rear standards 27 also at the outer faces of said standards, as is particularly shown at $32^b$ in Fig. 2.

Ropes, chains, or cables 33 are attached at one end in any approved manner to the forward ends of the lower arms 32 and are carried up over the grooved pulleys 25 and then down to an attachment to drums 34, two of which drums, as is shown in Fig. 1, are secured upon a shaft 35, parallel with the axle 15 and more or less adjacent thereto. The said drum-shaft at its right-hand end is mounted in ordinary bearings; but at its left-hand end it is mounted in bearings having an elongated opening 36, as is shown in Figs. 2 and 8, so that this end of the drum-shaft is capable of forward and rearward movement to and from the axle 15. At the left-hand end of the drum-shaft 35 a gear 37 is secured, which gear when the rake is to be raised engages with the gear 17 on the axle 15. This shifting of the drum-shaft 35 is accomplished through the medium of what may be termed a "shifting mechanism," (shown best in Fig. 8,) wherein an angular shifting arm 38 is provided, pivotally connected at the junction of its members to a link 39, the said link being mounted to turn on the tubular connecting-rod 19, said rod being held from turning by passing pins 40 through it into the sides 10 of the frame. The lower end of the shifting arm 38 is provided with an eye which receives the drum-shaft, as is shown in Fig. 8, so that by moving the said shifting arm 38 at its upper end the drum-shaft will be moved forward or backward to bring the gear 37 in mesh with the driving-gear 17 or to carry it out of engagement therefrom.

In order to regulate the extent of the movement of the left-hand end of the drum-shaft 35, a lip 41 is formed at the rear edge portion of the upper part of the shifting arm 38, and a horizontal lug 42 is formed beneath said lip on the upper edge of the link 39, and a set-screw 43 is passed through the said lug to be engaged by the said lip 41. A shifting bar 45 is provided with a metal tip 44, which tip is pivotally connected with the upper end of the shifting arm 38. This shifting bar 45 extends rearward past the left-hand standard 27 and is pivotally connected to a crank-arm 46, formed at the outer end of the shaft 47, journaled in suitable bearings in the left-hand standard 27 and in the brace 28 connected therewith, as is shown in Fig. 5, and a foot or a hand lever 48 is secured to the inner end of the said shaft 47. This lever 48 is within convenient reach of the driver, so that by moving the lever 48 in the proper direction the drum-shaft may be carried out of action or brought into action, as occasion may demand. However, when the rake has been carried up to its extreme upper position on the forward standards 20 the gear 37 is automatically drawn out of mesh with the gear 17 and the rotation of the drum-shaft is stopped. This is accomplished as shown in Fig. 2.

Two short arms 49 and $49^a$ are pivoted at their rear ends to the outer faces of the left-hand standard 20, one above the other, to extend beyond the forward edge of said standard a required distance. A link or cable 50 is connected with the lower arm 49 and with the pivot-pin 51, which connects the angle shifting arm 38 to the link 39, as is shown in Fig. 8. A second link or cable 52 connects the lower arm 49 with the upper arm $49^a$, and a pin 53 is made to extend from the inner face of the left-hand lower combined guide and lifting arm 32, as is shown in Figs. 2 and 9, the said pin being so located that when the arms 31 and 32 commence to ascend said pin will not engage the lower pivoted arm 49; but when the rake has reached its upper position the pin 53 will engage the upper pivoted arm 49ª and will operate the shifting arm 38 in a manner to carry the gear 37 out of engagement with the driving-gear 17. It may be here remarked that the rear standards 27 are strengthened by braces 54, extending forward and attached at their forward ends to the side pieces of the base-frame.

In regard to the mechanism for permitting the rake to drop after a load has been dumped said mechanism is as follows: As is best shown in Figs. 3 and 4, a ratchet-wheel 55 is secured to the right-hand drum 34, and the teeth of this ratchet-wheel are engaged by a pawl 56, pivoted on the connecting-rod 19. In connection with the said pawl a forwardly and upwardly curved lever-arm 57 is provided, which is fulcrumed upon a bracket 58, secured, preferably, to the right-hand diagonal brace 14, and a link 59 connects this lever-arm 57 with the lower portion of the pawl 56, so that the movement of the pawl 56 is regulated by the movement of the lever-arm 57; but the said pawl 56 is normally kept in engagement with the teeth of the ratchet-wheel 55, as shown in Fig. 3, by means of a spring attached at one end to an extension 61 from the lever-arm 57, the other end of the spring being secured to the aforesaid diagonal brace-bar 14. The lever-arm 57 is operated through the medium of a releasing-bar 62, pivotally connected with the upper end of the said lever-arm, preferably by means of a metal strap 63, and the said releasing-bar 62 extends rearwardly at the right-hand side of the frame, as is shown in Fig. 2, and is connected at its rear end to a crank-arm 64 at the outer end of a shaft 65, journaled in the right-hand standard 27 and connecting-brace 28. At the inner end of the said shaft 65 a foot or a hand lever 66 is secured, and therefore at any time the driver, by properly operating the said lever 66, can carry the pawl 56 out of engagement with the ratchet-wheel, whereupon the weight of the rake will cause it to descend.

In order to check the descent of the rake, I employ a brake mechanism, which is shown in Figs. 1, 3, and 4. This brake mechanism consists of a disk 67, which is preferably integral with or attached to the outer side face of the ratchet-wheel 55, and a strap-brake 68 is passed over the periphery of said disk 67. In connection with the strap-brake an operating-lever 69 is employed, fulcrumed upon the tubular connecting-bar 19, extending a suitable distance above and below said bar, and the ends of the strap-brake are pivotally connected to the said operating-lever 69 by means of links 70 and 71, located one below and the other above the pivot-point of the said operating-lever. The upper end of the operating-lever 69 is pivotally connected to a strap or metal terminal 72 for a brake-arm 73, which brake-arm is carried rearward above the releasing-arm 62 and is pivoted at its rear end to a crank-arm 74, which is at the outer end of a shaft 75, journaled in bearings in the right-hand standard 27, and its brace 28 above and parallel with the shaft 65, controlling the releasing mechanism. At the outer end of the brake-shaft 75 a hand-lever 76 is secured, so that the brake also is under the perfect control of the driver.

The driver's seat 77 is located at the rear central portion of the frame, and the standard thereof is secured to a longitudinal platform 78, located at the rear central upper portion of the base-frame, as is shown in Figs. 2 and 5, and the outer end of this platform rests upon a block 79, which in its turn rests upon the rear connecting-bar 12.

The mechanism for dumping the rake or for carrying the teeth to a lower inclined, upper inclined, or a horizontal position is as follows: Two dumping-arms 80 are employed, which are pivotally connected to the upper portion of the vertical section b of the rake B near the ends of the rake, as is shown particularly at 81 in Figs. 1 and 2. These two arms 80 are made to converge at the central portion of the rear of the machine, where they are connected in any suitable or approved manner to a single bar 82, which bar 82 is provided with rack-teeth 83 upon its under face. The rack-teeth of the bar 82 are adapted to engage with a pinion 84, (shown best in Fig. 6,) which pinion is carried by a swinging standard 85, centrally located between the rear stationary standards 27. To that end plates 87 are secured to opposite sides of the said swinging standard 85, being carried above the upper end of the said standard, and the shaft 88, on which the said pinion is mounted, extends beyond both of the said plates 87. The said shaft likewise passes through the side portions of a carriage 89, which side portions of the carriage are located between the plates 87 and the pinion 84, protecting the latter, and the said carriage 89 is provided at its upper portion with friction-rollers 90, adapted to travel upon the upper surface of the said bar 82, the upper surface of which bar is preferably given a track formation, (shown in Fig. 6,) and the friction-rollers 90 are preferably grooved to receive said track. A notched wheel 91 is secured to the left-hand end of the shaft 88, and at the right-hand end of said shaft a sprocket-wheel 92 is secured.

With reference to the swinging standard 85 it is pivotally mounted between its ends upon a shaft 86, which extends through the standards 27 and also usually through the rear ends of the combined lifting and guide arms 32, as is shown in Fig. 5. The dumping-arms are carried forward or rearward to elevate or depress the rake-teeth by the action of the pinion 84 on the rake-bar 82, and the necessary movement of the pinion is brought about by passing an endless chain belt 93 over the sprocket-wheel 92 and then over a sprocket-pinion 94, mounted to turn on the shaft 86, which pinion is attached to a hand-wheel 95, so that the operation of the rake is entirely under the control of the driver and one man is enabled to operate the machine.

The rake-teeth are held in the position to which they have been adjusted by locating a spring-controlled latch 96 is suitable bearings in the left-hand plate 87 of the swinging standard 85, which latch is adapted to enter any one of the notches in the notched wheel 91. This latch is connected with a lever 98, located on the said swinging standard and extending rearward therefrom, by means of a connecting-bar 97.

In order to raise the rake sufficiently from the ground when in working position to prevent the teeth entering the ground and in order to elevate the rake sufficiently, so that the hay shall not trail upon the ground while being carried to the stack, I provide a controlling-lever 99, which is a foot-lever and is attached to a shaft 100, mounted on the platform 78 at the rear thereof. This shaft 100 is provided with a crank-arm 101 at its opposite end, which crank-arm is connected by a curved link 102 with the bottom of the swinging standard 85. Therefore by moving the lever 99 in one direction the lower end of the swinging standard will be moved so as to operate the dumping-arm sufficiently to carry the teeth b' of the rake upward to a proper extent, and the curved link 102 will serve to automatically lock the lever in the position in which it may be placed. The adjustment of the rake, however, through the medium of the said operating-lever 99 is limited.

The platform 78 is provided with a central longitudinal opening 102$^a$, into which the lower end of the swinging standard enters to a greater or lesser extent.

The rake is automatically carried from direct engagement with the ground by the action of draft devices, (shown in Figs. 1 2,) two of which are employed, one at each side of the machine, and each of the said devices consists of a long draft-tree 104, fulcrumed at a point 105 between its center and outer end on a side portion of the main frame A, as is shown by dotted lines in Fig. 1, and the inner ends of these draft-trees approach each other at a point beneath the platform 78, as is shown in Fig. 7. Each draft device is completed by the addition of a swingletree 106 to the outer end portion of each long draft-tree 104. Chains 107 are attached to the two draft-trees 104, and said chains 107 of the two draft-trees are brought together and are connected by a single chain 108, which single chain is passed upward over a friction-pulley 109, located at the forward portion of the opening 102 in the platform 78, and the other end of the said chain 108 is attached in any suitable manner to the bottom portion of the swinging standard 85. Thus when the team starts forward as the team faces forward the draft devices immediately upon being placed under tension will act upon the bottom of the swinging standard 86 to automatically raise the teeth of the rake a distance from the ground limited by the adjustment of the controlling-lever 99. This controlling-lever 99 may be brought into action whenever it is desired to so elevate the outer ends of the rake-teeth as to cause the teeth to clear any mound or like obstruction in the path of the machine.

Having thus described my invention, I claim as new and desire to secure by Letters Patent—

1. In a hay rake and stacker, the combination with a wheel-supported frame, a rake and connections pivoted to the rake and the frame, of a gear located on the axle of the frame, a drum-shaft mounted in the frame parallel with the axle, said shaft having forward and rearward movement at one end, a gear on the said shaft at its shifting end, adapted to mesh with the gear on the axle, a shifting arm pivoted on the frame and connected with the said shifting end of the drum-shaft, a shifting bar connected with the shifting arm and extending to the rear of the frame, a crank-shaft connected with the said shifting bar, a shifting lever connected with the said shaft, a support carried upward from the frame at the rear of the rake, link-connected tripping-arms pivoted on said support, a connection between the said trip-arms and the shifting arm, and a projection from the said connections between the rake and the frame, adapted to engage the upper trip-arm when the rake is elevated.

2. In a hay rake and stacker, a wheeled support, forward and rear standards upon said support, the forward standards being higher than the rear, a rake located in advance of the forward standards, hangers pivotally connected with the rake, upper and lower combined lifting and guide arms at each side of the frame, pivotally connected with the said hangers and with the said rear standards, a gear-wheel located on the axle of the frame, a drum-shaft mounted in the said frame parallel with the axle, which drum-shaft at one end is mounted for forward and rearward movement, drums on said shaft, a gear at said shifting end of the drum-shaft, adapted for engagement with the gear on the axle, a shifting lever mounted on the frame and connected with the said shifting end of the drum-shaft, a crank-shaft at the rear of the machine, connected with the said lever and terminating at its inner end in a handle, guide devices carried by the forward standard, lift-cables connected with the lower lift-arms, being passed over the said guide devices and connected with the said drums, trip-arms pivoted upon one of the forward standards, link connections between the trip-arms, a connection between the lower trip-arm and the shifting lever, and a projection from the lifting-arm, adapted to engage the projecting portion of the upper trip-arm when the rake is raised to dumping position.

3. In a hay rake and stacker, a wheel-supported frame, the axle whereof is provided with a gear near one end, forward and rear standards carried by the frame, friction-pulleys carried by the upper portion of the forward standards, a rake, hangers pivotally connected with the rake, upper and lower combined guide and lift arms pivoted at their forward ends to the hangers and at their rear ends to the rear standards, a drum-shaft adjacent to the axle, one end of which drum-shaft is mounted for forward and rearward movement, a gear on the shifting end of the drum-shaft adapted to mesh with the gear of the axle, a shifting arm mounted on the frame and connected with the shifting end of the drum-shaft, forwardly-extending horizontal arms pivoted to one of the forward standards, connections between the arms and between the lowermost arm and the said shifting arm, a pin extending from the inner side of one of the lower lift-arms, adapted when the rake is fully elevated to engage with the upper horizontal arm and carry the drum-shaft out of connection with the axle, drums on the said drum-shaft, and cables attached to the forward ends of the lower lift-arms and passed over said friction-pulleys to a connection with the said drums.

4. In a hay rake and stacker, a wheel-supported frame the axle whereof is provided with a gear near one end, forward and rear standards carried by the frame, friction-pulleys carried by the upper portion of the forward standards, a rake, hangers pivotally connected with the rake, upper and lower combined guide and lift arms pivoted at their forward ends to the hangers and at their rear ends to the rear standards, a drum-shaft adjacent to the axle, one end of which drum-shaft is mounted for forward and rearward movement, a gear on the shifting end of the drum-shaft, adapted to mesh with the gear of the axle, a shifting arm mounted on the frame and connected with the shifting end of the drum-shaft, forwardly-extending horizontal arms pivoted to one of the forward standards, connections between the arms and between the lowermost arm and the said shifting arm, a pin extending from the inner side of one of the lower lift-arms, adapted when the rake is fully elevated to engage with the upper horizontal arm and carry the drum-shaft out of connection with the axle, drums on the said drum-shaft, and cables attached to the forward ends of the lower lift-arms, passed over the said friction-pulleys to a connection with the said drums, a shifting bar connected with the said shifting arm, a crank-shaft connected with said bar at the rear of the frame, and a shifting lever connected with the said shaft.

5. In a hay rake and stacker, a wheeled support, forward and rear standards carried by the support, a shaft carried by the rear standards, a swinging standard pivotally mounted on the said shaft, being free at its upper and at its lower end, an operating-lever for the said swinging standard, a rake, hangers pivotally connected with the rake, guide-arms pivotally connected with the hangers and the rear standards, means for raising and lowering the said rake, arms pivoted to the upper portion of the vertical section of the rake, a rack-bar to which said arms are connected, a pinion carried at the upper end of the swinging standard for engagement with the teeth of the said rack-bar, a sprocket-wheel on the same shaft as the pinion, a combined sprocket-pinion and hand-wheel mounted on the shaft connecting the rear standards, and a chain connection between the sprocket-wheel and sprocket-pinion, whereby to dump the rake or give upper and lower inclination to the rake-teeth.

6. In a hay rake and stacker, a wheel-supported frame, forward and rear standards carried by the frame, a rake located in front of the forward standards and having a vertical section, a pivotal support for the rake and guides for said supports, pivoted thereto and to the rear standards, a shaft extending from one rear standard to the other, a swinging standard pivotally mounted on said shaft, arms attached to the upper portion of the vertical section of the rake, a rack-bar connecting said arms at the rear, a pinion mounted at the upper portion of the swinging standard, engaging the teeth of the rack-bar, a notched wheel, and a sprocket-wheel secured to the same shaft as the pinion, a sprocket-pinion and attached hand-wheel mounted on the shaft between the rear standards, a chain connection between the sprocket-pinion and sprocket-wheel, a spring-controlled latch arranged for engagement with the notched wheel, and a lever for operating the said latch.

7. In a hay rake and stacker, a wheel-supported frame, forward and rear standards carried by the frame, a rake located in front of the forward standards and having a vertical section, a pivotal support for the rake and guides for said support, pivoted thereto and to the rear standards, a shaft extending from one rear standard to the other, a swinging standard pivotally mounted on said shaft, arms attached to the upper portion of the vertical section of the rake, a rack-bar connecting said arms at the rear, a pinion mounted at the upper portion of the swinging standard, engaging the teeth of the rack-bar, a notched wheel, and a sprocket-wheel secured to the same shaft as the pinion, a sprocket-pinion and attached hand-wheel mounted on the shaft between the rear standards, a chain connection between the sprocket-pinion and the sprocket-wheel, a spring-controlled latch arranged for engagement with the notched wheel, a lever for operating the said latch, a carriage through which the shaft of the pinion, sprocket-wheel and the notched wheel passes, friction-rollers carried by the said carriage for engagement with the upper edge of the rack-bar, and an operating-lever for the lower end of the swinging standard.

8. In a hay rake and stacker, a wheel-supported frame, forward and rear standards carried by the frame, a rake located in front of the forward standards and having a vertical section, a pivotal support for the rake and guides for said support, pivoted thereto and to the rear standards, a shaft extending from one rear standard to the other, a swinging standard pivotally mounted on said shaft, arms attached to the upper portion of the vertical section of the rake, a rack-bar connecting said arms at the rear, a pinion mounted at the upper portion of the swinging standard, engaging the teeth of the rack-bar, a notched wheel, and a sprocket-wheel secured to the same shaft as the pinion, a sprocket-pinion and attached hand-wheel mounted on the shaft between the rear standards, a chain connection between the sprocket-pinion and the sprocket-wheel, a spring-controlled latch arranged for engagement with the notched wheel, a lever for operating the said latch, a carriage through which the shaft of the pinion, the sprocket-wheel and the notched wheel passes, friction-rollers carried by the said carriage for engagement with the upper edge of the rack-bar, and an operating-lever for the lower end of the swinging standard, a draft device comprising two lengthy draft-trees having their inner ends adjacent to the lower end of the swinging standard, a guide-pulley mounted in the frame, chains connected to the inner ends of the said lengthy doubletrees, a single chain connecting the first-named chains, which single chain is passed over said pulley to an attachment to the lower end of the swinging standard, and a swingletree at the outer end of each lengthy draft-tree.

In testimony whereof I have signed my name to this specification in the presence of two subscribing witnesses.

ORIN B. MANN.

Witnesses:
   I. M. FORREST,
   ALEX A. LINTON.